United States Patent
Trucco

(10) Patent No.: US 6,866,633 B2
(45) Date of Patent: Mar. 15, 2005

(54) METHOD AND APPARATUS FOR ULTRASONIC IMAGING USING ACOUSTIC BEAMFORMING

(75) Inventor: Andrea Trucco, Genoa (IT)

(73) Assignee: Esaote, S.p.A., Casale Monferrato (IT)

(*) Notice: Subject to any disclaimer, the term of this patent is extended or adjusted under 35 U.S.C. 154(b) by 0 days.

(21) Appl. No.: 10/722,989

(22) Filed: Nov. 26, 2003

(65) Prior Publication Data

US 2004/0138565 A1 Jul. 15, 2004

(30) Foreign Application Priority Data

Nov. 28, 2002 (IT) .................................... SV200200058

(51) Int. Cl.$^7$ ................................................ A61B 8/00
(52) U.S. Cl. ............................................................ 600/443
(58) Field of Search .............................. 600/437, 443, 600/447, 458; 128/916; 367/7, 11, 103, 105, 138; 73/624–626

(56) References Cited

U.S. PATENT DOCUMENTS

| | | | |
|---|---|---|---|
| 5,685,308 A | * | 11/1997 | Wright et al. ................ 600/443 |
| 5,740,128 A | * | 4/1998 | Hossack et al. ............. 367/138 |
| 6,186,950 B1 | | 2/2001 | Averkiou et al. |
| 6,193,662 B1 | | 2/2001 | Hwang |
| 6,193,663 B1 | | 2/2001 | Napolitano et al. |
| 6,401,539 B1 | | 6/2002 | Langdon et al. |
| 6,658,141 B1 | * | 12/2003 | Jeong .......................... 382/128 |

* cited by examiner

Primary Examiner—Francis J. Jaworski
(74) Attorney, Agent, or Firm—Woodard, Emhardt, Moriarty, McNett & Henry LLP

(57) ABSTRACT

A method and apparatus for ultrasonic imaging in which acoustic, and in particular ultrasonic, receiver beamforming utilizes delays which are partially determined as a function of the frequency of the received signals and as a function of the position of the individual receiving transducers in the entire array of receiving transducers.

42 Claims, 9 Drawing Sheets

FUNDAMENTAL FREQ. STATE OF THE ART

SECOND HARMONIC STATE OF THE ART

FUNDAMENTAL FREQ.

SECOND HARMONIC

FUNDAMENTAL FREQ.

SECOND HARMONIC

SEQUENCE: 0,1,0,1,0,1, ...

FUNDAMENTAL FREQ.

SECOND HARMONIC

SEQUENCE: 0,1,-1,0,1,-1, ...

FUNDAMENTAL FREQ.

SECOND HARMONIC

SEQUENCE: 0,1,0,-1,0,1,0,-1, ...

FUNDAMENTAL FREQ.

SECOND HARMONIC

FUNDAMENTAL FREQ.

SECOND HARMONIC

METHOD AND APPARATUS FOR ULTRASONIC IMAGING USING ACOUSTIC BEAMFORMING

The invention relates to a method and apparatus for ultrasonic imaging, and in particular, to ultrasonic imaging utilizing acoustic receiver beamforming techniques.

CROSS-REFERENCE TO RELATED APPLICATION

The present application claims priority of Italian Patent Application Ser. No. SV2002A000058 filed Nov. 28, 2002, which is hereby incorporated by reference in its entirety.

BACKGROUND OF THE INVENTION

Among the various ultrasonic imaging techniques, one technique provides focusing of at least the received beam, but typically both the transmitted beam and the received beam, to a scan area, point or line which extends through a certain depth in the body under examination, from the transmission surface of the transducers into the body under examination.

During beam transmission, the acoustic energy generated by the transducers are concentrated upon the particular area, line or point. During beam reception, beamforming techniques are used to receive and synchronize the components of the signals received by the receiving transducers, and reflected by the particular area, line and point.

The time delays imparted to the reflected signals are a function of the propagation velocity of acoustic waves in the body under examination, of the steering angle of each transducer relative to the reflection line or point, and of the position of each receiving transducer in its array. Transducer arrays of ultrasonic probes may be of different types, provided that transducers are arranged side-by-side over at least one straight or curved line, or over a flat or curved surface.

In other types of probes, a transducer array having a smaller number of transducer is translated or rotated to cover a wider field of view. With a few obvious variants, the above method also applies to these types of transducer arrays, by simply accounting for their movement during scanning.

In the latest generations of ultrasonic imaging apparatus, especially those used in combination with contrast agents, imaging is based on the part of the received signal which frequency is a harmonic of the fundamental transmission frequency. In this case, the fundamental frequency component of the received signal must be separated and/or suppressed to allow imaging. This is mainly due to the fact that the fundamental frequency component of the signal has a much higher amplitude than harmonic frequency components, such that it generates imaging noise.

In prior art, separation of the second harmonic component of the received signal from the fundamental transmission frequency component is obtained by using various techniques. One of these techniques provides the use of adaptive filters which require a greater computational load in the received signal processing process, and also require a certain knowledge of the received signal.

Other techniques for separating the second harmonic component of the received signal from the fundamental frequency component use a double firing of acoustic pulses wherein the corresponding received signals are combined in such a manner as to cause the suppression of the fundamental frequency component.

One of these techniques is, for instance, the so-called "pulse inversion" technique, in which two transmit pulses are phase inverted and their received signals are summed. These techniques avoid the use adaptive filters, but require double imaging times as each scan line require the transmission of an additional ultrasonic pulse.

U.S. Pat. No. 6,193,663 discloses a medial diagnostic ultrasonic imaging system which acquires received beams from spatially distinct transmitted beams. The transmitted beams alternate in type between at least first and second types across the region being imaged. The first and second types of received beams differ in at least one scan parameter other than transmission and receiver line geometry and can, for example, differ in transmission pulse phase, transmission focus, transmission or receiver aperture, system frequency complex phase angle, transmission code or transmission gain. Received beams associated with spatially distinct ones of the transmitted beams (including at least one beam of the first type and at least one beam of the second type) are then combined. In this way, many two-pulse techniques can be used while substantially reducing the frame rate penalty normally associated with such techniques. The transmitted beams are transmitted at different times. The delays used for forming the received beams depend only from the direction, i.e. the so called steering of the beam and from the position of the transducers forming the probe.

U.S. Pat. No. 6,186,950 also discloses an ultrasound imaging apparatus combining the received beams generated from different transmitted beams transmitted at different successive instants.

U.S. Pat. No. 6,193,663 and U.S. Pat. No. 6,186,950 do not modify the classical techniques of beamforming, either for the transmitted beams and for the received beams.

The invention has the object of providing a method like the one described hereinbefore, which allows to separate the fundamental frequency component of the receive signal from the component at one of the harmonics, especially the second harmonic, of said fundamental frequency, by using a method which is as simple as the methods that allow such separation by combining the receive signal of two successive identical transmit pulses without requiring said double transmission, thereby reducing imaging or scanning times.

BRIEF SUMMARY OF THE INVENTION

The present invention solves the above problem by providing a method wherein time delays are also calculated as a function of the operating frequency and of the position of each transducer to which receiver signals delays are applied. The delay calculation function may be of any type. The dependence of the position of the transducers to which receiver signals delays are imparted may be of the linear or non linear type.

Particularly, the invention provides the addition of a term to the delay calculation function, with the term depending from the frequency of the desired signal component and also being linearly or non linearly dependent from the index of the corresponding receiving transducer, i.e. from the position thereof in an array of receiving transducers.

The delay thereby determined is a function of the selected frequency component of the received signal to be used for image data transformation, whereby a phase shift is introduced which automatically suppress the fundamental frequency component while summing the signals of the receiving transducers.

With particular reference to Harmonic Imaging, i.e. to the use of second harmonic components of signals to generate image data, the dependence of time delays from the second harmonic frequency causes a phase shift of received signals which, when the signals from the receiving transducers are summed, causes automatic suppression of fundamental frequency signal components, whereas the harmonic frequency signal components are in phase with each other and those components are summed in a non destructive manner, thereby forming an amplified signal of second harmonic frequency components.

Since received signals are not continuous but pulsed signals, edge effects occur, such that phase shifted pulses partly overlap, whereby, in the simple embodiment of the method as described above, fundamental frequency components of the received signal are not completely suppressed and amplification is reduced in combination with a longer pulse duration for harmonic frequency components, particularly those at the second harmonic of the fundamental frequency.

In order to further suppress these side effects, the invention provides a variant in which the phase shift direction of successive signals is changed with reference to the moment in which they are received from the corresponding transducer of the transducer array, so that the phase shift is kept substantially constant for fundamental frequency components and for the components at the selected harmonic, particularly the second harmonic, respectively.

A variant embodiment of the invention provides that the delay calculation term, which is a function of the selected frequency for the signal components from which image data is to be retrieved, is associated with a phase shift direction changing sequence in which the elements are applied as a function of the transducer index with reference to the position of transducers in the array.

A possible sequence is a 0, 1, 0, 1, 0, 1, ... sequence, corresponding to a rem (i/2) function, in which "i" is the index of the transducer in the transducer array; where the rem (a/b) function is the remainder of the division of a by b.

A variant embodiment provides a different sequence, 0, 1, −1, 0, 1, −1, ... corresponding to a (rem((i+1)/3)−1) function, where "i" is the index of each transducer in the transducer array.

A further possible sequence includes the elements 0, 1, 0, −1, 0, 1, 0, −1, ... corresponding to a $(-1)^{(i+1)/2}$rem(i/2) function, where "i" is the index of each transducer in the transducer array.

In this case, when the receive signals are summed, the above mentioned edge effects are substantially reduced in time for the fundamental frequency, while obtaining the highest signal amplification for the sum of harmonic, particularly second harmonic, components, and a reduced time extension of the signal.

In order to further remove edge effects that are considerably reduced and substantially located at the ends of the pulsed sum signal of the fundamental frequency components, a signal having an envelope with smoothed edges may be further provided, for instance, a signal with a triangular envelope or a Gaussian curve, which further reduces, in this case, the amplitude of edge effects in the signal resulting from the sum of fundamental frequency components, while the amplification of the overall receive signal, i.e. the sum of the selected harmonic, particularly second harmonic, components of the signals from the transducers is still high and the characteristics of a short duration of the sum signal are also maintained.

Thus, the inventive method allows to suppress the fundamental frequency components of signals upon received beam focusing, with no massive hardware load and without requiring longer processing or scanning times, unlike prior art Harmonic Imaging techniques.

The present invention addresses an apparatus for implementing this method, particularly an ultrasonic imaging apparatus, comprising at least one ultrasonic probe with a plurality of transmitting transducers and a plurality of receiving transducers. A receiver beamforming unit is connected to the receiving transducers for application of received signal synchronization delays to the individual receiving transducers, with reference to the direction in which transducers are focused to one or more reflection sources. Apparatus is provided for processing received signals, which includes the suppressing or at least attenuating the fundamental frequency component of the received signals. Apparatus sums the received signals from their respective receiving transducers and transforms the sum signals into image data, as well as for displays the image data in the form of graphic images.

According to the present invention, the receiver beamforming apparatus comprises a unit which can be programmed or controlled by programmable control means, and contains the algorithms for calculating the received signal delays for each receiving transducer, which delays are calculated as a function of the transducer position in the array with respect to a predetermined reference point, and based on the steering angle and on a predetermined harmonic of the fundamental frequency of received signals.

According to an improvement of the present invention, the receiver beamforming units are programmed or controlled by apparatus that is programmable to calculate the receiver delays for each receiving transducer in order to generate a change in the phase shift direction, which phase shift is caused by the functional dependence of delays from the selected harmonic frequency, particularly the second harmonic frequency.

In particular, the receiver beamforming unit is programmed or controlled by programmable means in such a manner as to combine the phase shift of the received signals of transducers caused by the application of functional delays and by the dependence thereof from the selected harmonic frequency, particularly the second harmonic, with a phase shift direction changing sequence, composed of alternate "0" and "1" elements. This sequence is defined, for instance, by a rem (i/2) function, where "i" is the index of the transducer in the transducer array and (a/b) rem function as defined above.

A variant embodiment provides a different sequence, 0, 1, −1, 0, 1, −1, ... corresponding to a (rem((i+1)/3)−1) function, where "i" is the index of each transducer in the transducer array. Yet a further possible sequence includes the elements 0, 1, 0, −1, 0, 1, 0, −1, ... corresponding to a $(-1)^{(i+1)/2}$rem(i/2) function, where "i" is the index of each transducer in the transducer array.

According to another improvement of the invention, the apparatus further includes means for generating pulsed acoustic beams whose time curve has an envelope with smoothed edges, e.g. a triangular or Gaussian envelope. Thanks to this operation, the received signals from the individual transducers will also have echoes with a smoothed envelope, thereby enhancing system performance. As an alternative to the above, filters may be provided, which operate on received signals to smooth the envelope of received echoes on the basis of the transmitted signals.

Further improvements and advantages of the inventive method will form the subject of the subclaims.

The characteristics of the invention and the advantages derived therefrom will appear more clearly from the following description of a non limiting embodiment, illustrated in the annexed drawings.

DETAILED DESCRIPTION OF THE PREFERRED EMBODIMENTS

Figure 1:
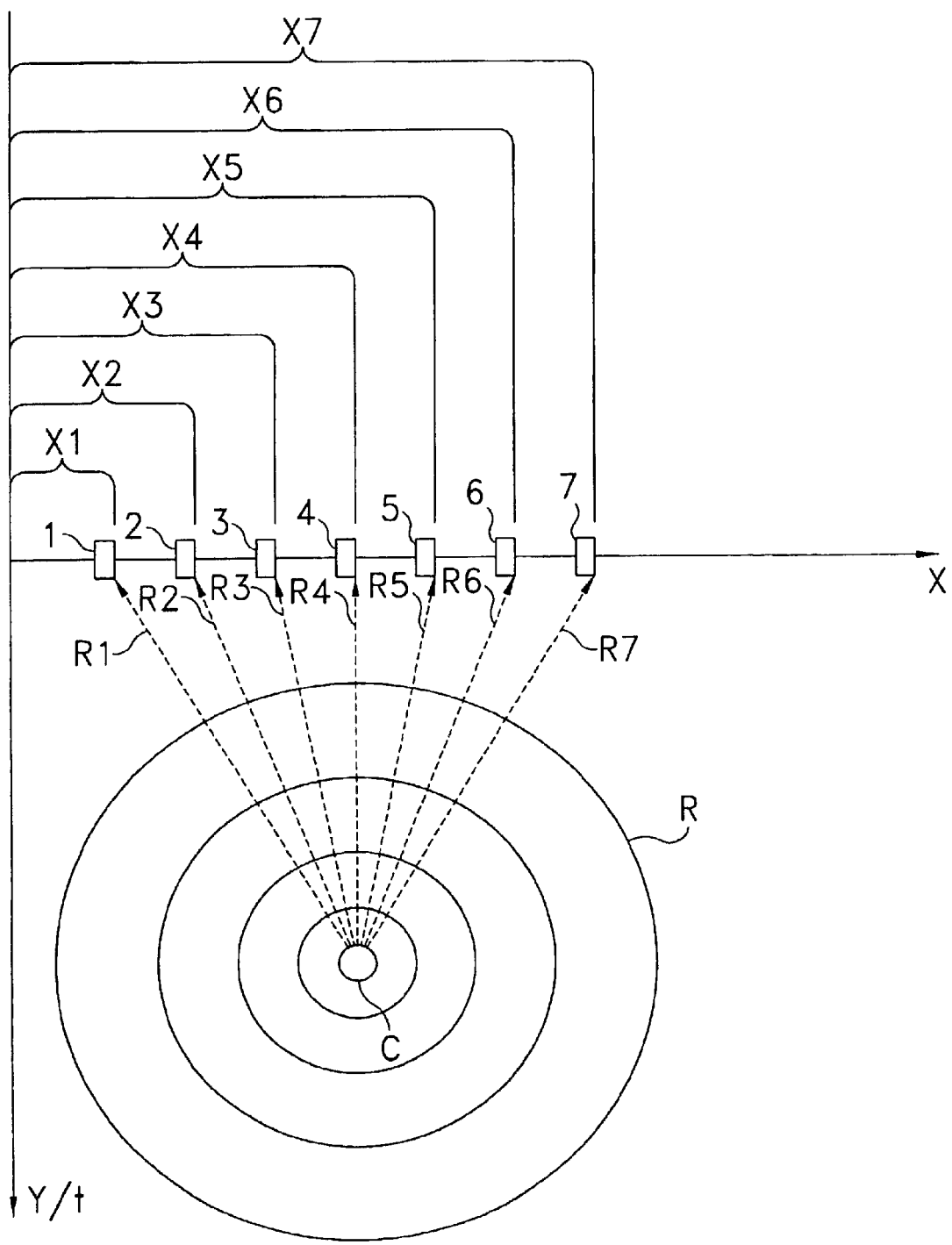
FIG. 1 is a greatly simplified view of the receiver arrangement which includes the application of time delays to focusing of ultrasonic beams reflected toward the receiving transducers of an ultrasonic probe.

FIG. 1 is a schematic and drastically simplified view of an ultrasonic signal receiving configuration which implies the need of focusing the received beams by imparting delays to windows of reception actuation of the receiving transducers of an array.

Seven transducers are arranged along the x axis, the Figure showing them in spaced positions for graphical convenience, although they are in adjacent positions, i.e., closely arranged, in actual ultrasonic probes.

The transducers are designated with numbers 1 to 7 and the distance from a predetermined reference point, here the origin of the coordinate system, where t is designated as $X_1$, $X_2$, $X_3$, $X_4$, $X_5$, $X_6$, $X_7$, and where the index identifies the corresponding transducer. This notation is consistent with the general mathematical notation that will be used hereafter. Each transducer is identified by an index "i" whose value may be a whole number, which also identifies a certain position thereof in the transducer array, hence a certain distance from a predetermined reference point.

An ultrasonic beam transmitted into a body under examination, hence with a propagation direction Y, penetrates said body under examination. The distance y is proportional to the propagation time from the moment in which the beam is transmitted with the propagation velocity being constant in the body under examination.

The transmitted beam is then reflected by a reflector, designated as C and represented by way of example by a single point for the purpose of graphical convenience.

The reflector is physically equivalent to an ultrasonic wave transmission source, hence the reflected wave is shown in the schematic example as a spherical wave. The dashed arrows R1 to R7 show the directions along which the active receiving surfaces of the transducers are joined to the reflection point C.

As is apparent from the above description, the reflected signal contributions along the different directions R1 to R7 reach the corresponding transducers 1 to 7 at different times. In order to reconstruct the reflected beam, which is formed by the sum of the received signal contributions from all transducers 1 to 7 of the array, different receiver delays must be applied to each transducer, which delays must be calculated on the basis of the transducer position of the ultrasonic wave propagation velocity and generally of the steering angle, that is, the angle between the point C and the origin of the selected coordinate system, as well as, when necessary, of the distance of the point C from the origin of the coordinate system. Hence, the signals received by each transducer will be synchronized and the appropriate parts thereof, relative to the reflected beam generated by the reflector C, will be summed. It shall be noted that FIG. 1 does not show the transmission process in order to illustrate in a clearer manner the reflection process.

Figure 2:
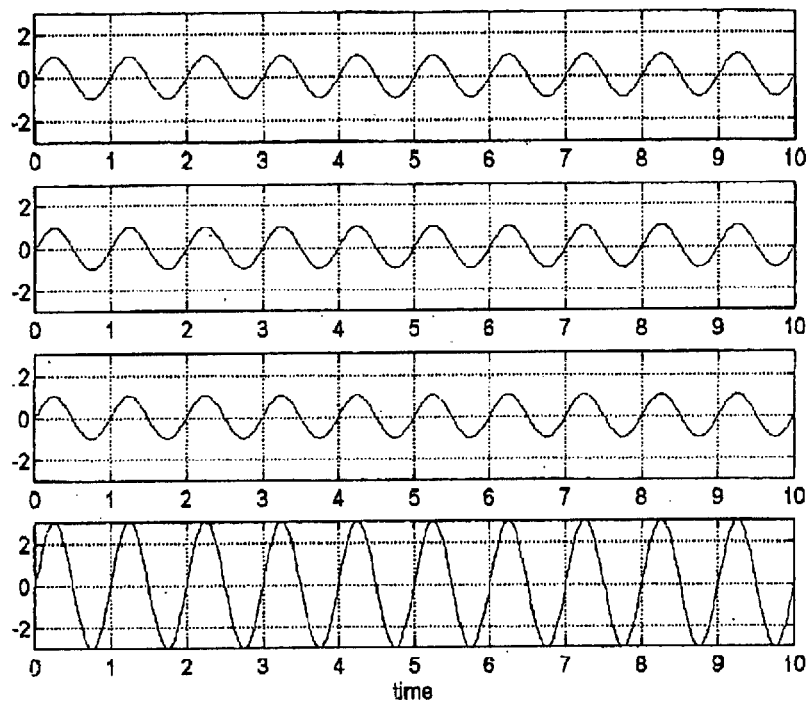
FIGS. 2 and 3 show a prior art method, known as the Delay and Sum method, applied to the fundamental frequency component of received signals and to the second harmonic component of received signals.
Figure 3:
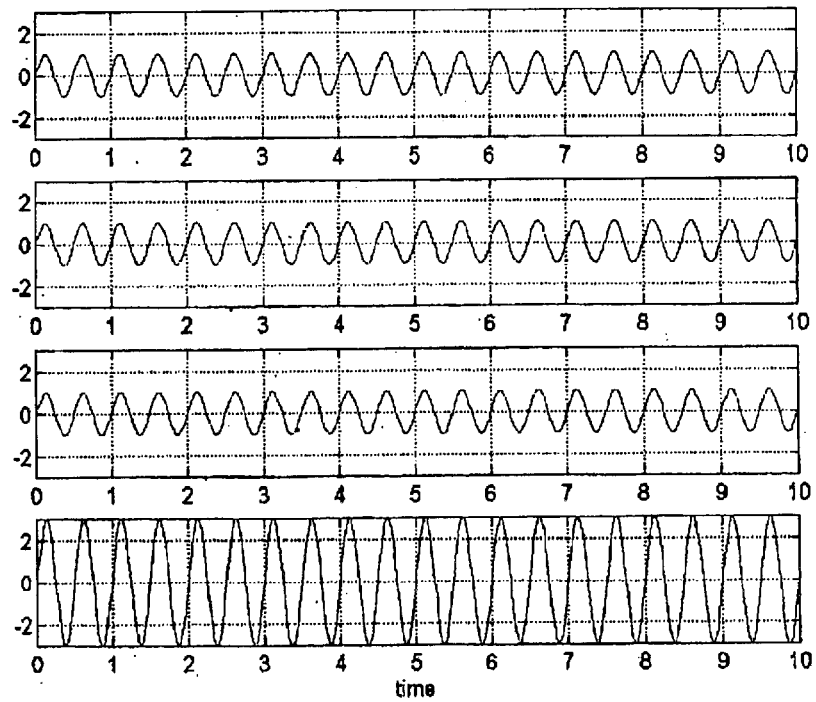

FIGS. 2 and 3 show the theoretical curves of the received signals of three transducers, after the application of the above mentioned delays, relative to the fundamental frequency component and to the second harmonic component, as well as the corresponding sum signals obtained with a prior art method, known as Delay & Sum.

Here, the received beam, i.e. the sum signal, is defined by the following equation:

$$b(t, \theta_0) = \sum_i s_i\left(t - \frac{x_i sen\theta_0}{c}\right)$$

The beam b is formed by the signal resulting from the sum of the signals of all transducers $S_i$, to which delays are imparted which are a function of the position $X_i$ of the individual transducers, of the steering angle, and of the ultrasonic wave propagation velocity, and subtracted from the actuation time t of the receiver window of the transducer array, i.e. of the transducer having a zero delay. The delay term that is inserted in the previous equation refers to a scene situated in the far field; if the scene is situated in the near field, then the delay term shall be updated to further account for the distance of the scene from the origin of the selected coordinate system. This update is made by following prior art rules, particularly the well-known dynamic focusing technique, and does not affect or alter in any manner the validity and functionality of the invention. Therefore, for the sake of simplicity, the description below regarding the Delay & Sum method will relate to delays determined for a scene in the far field, while it will be implicitly understood that those delays may be replaced by delays determined for a scene in the near field, as is known in prior art. It shall be noted that the delays imparted to receiving transducers require a synchronization of signals, as shown in FIGS. 2 and 3, regardless of the frequency thereof, whereby the sum signal involves an amplification of the individual signals of the receiving transducers. In fact, the above equation provides no dependence of the sum signal b from frequency. Therefore, when the traditional Delay & Sum beamforming method is used, the so-called Harmonic Imaging mode, in which second harmonic components of received signals are used to obtain image data, requires further processing to suppress or substantially drastically reduce the fundamental frequency component of the signal. This is necessary because the signal amplitude at the fundamental frequency is considerably higher than the signal amplitude at the second harmonic frequency, and thereby produces a glare-like effect which prevents Harmonic Imaging processing. In prior art methods, as described in the introduction, other arrangements are used to suppress or drastically reduce the fundamental frequency component, such as the use of adaptive filters or the provision of double transmission firings and the combination of the corresponding received signals to obtain the suppression of the fundamental frequency component.

Figure 4:
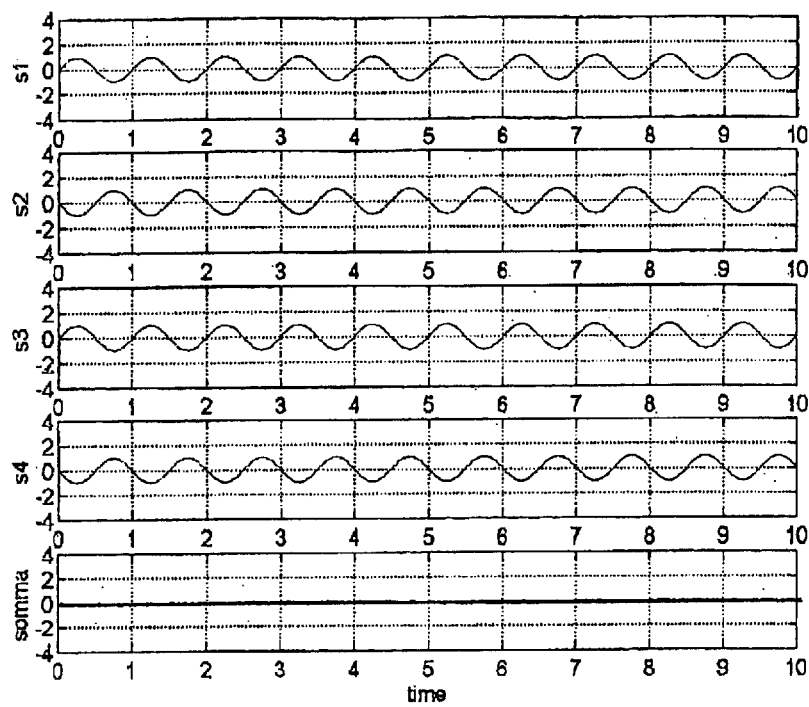
FIGS. 4 and 5 illustrate, using a configuration similar to that used in FIGS. 2 and 3, an aspect of the present invention with reference to ideal conditions.
Figure 5:
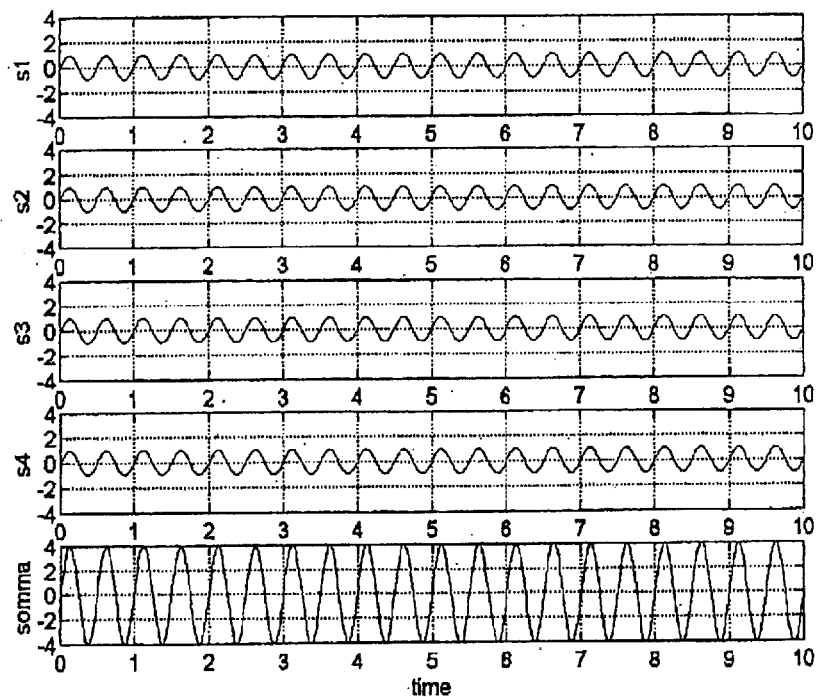

FIGS. 4 and 5 show received signals from a number of transducers, more particularly four transducers, which signals are identified as S1 to S4 and correspond in FIGS. 4 and 5 to the signal component at the fundamental frequency and to the signal component at the second harmonic of said fundamental frequency respectively. Moreover, the curve of the signal resulting from the sum of the individual received signals S1 to S4 is shown in the two above cases.

The method of the invention provides that the receiver delay to be imparted to each transducer depends on the frequency of the signal component that is selected for imaging, and is linearly dependent on the transducer index, i.e. on the position thereof in the transducer array.

Here, when Harmonic Imaging is only considered, the selected frequency is always twice the fundamental frequency.

The equation to determine the signal consisting of the sum of the received signals from all the receiving transducers, which signal forms the received beam is as follows:

$$b(t, \theta_0) = \sum_i s_i\left(t - \frac{x_i sen\theta_0}{c} - i\frac{1}{2f_0}\right)$$

where: "i"=transducer index;
$f_0$:=fundamental frequency;
$X_i$:=distance of the transducer "i" from a predetermined reference point;
$S_i$:=receive signal from the transducer "i";
$\theta_0$:=steering angle;
$b(t, \theta_0)$:=sum signal.

Here, the time delay introduces a phase shift between the received signals from the individual receiving transducers, which is equal to a half cycle of the fundamental frequency and is a linear function of "i". As is shown in FIG. 4, for the fundamental frequency component, this phase or time shift causes the signals of successive transducers to be always shifted by a half cycle with respect to those of the previous transducer when considering the components at the fundamental frequency $f_0$, whereby the received signals of the individual transducers suppress each other in pairs and their sum signal is equal to zero. Regarding the second harmonic components as shown in FIG. 5, the introduced phase shift always keeps the received signals in phase, with the sum signal being amplified thereby.

Figure 6:
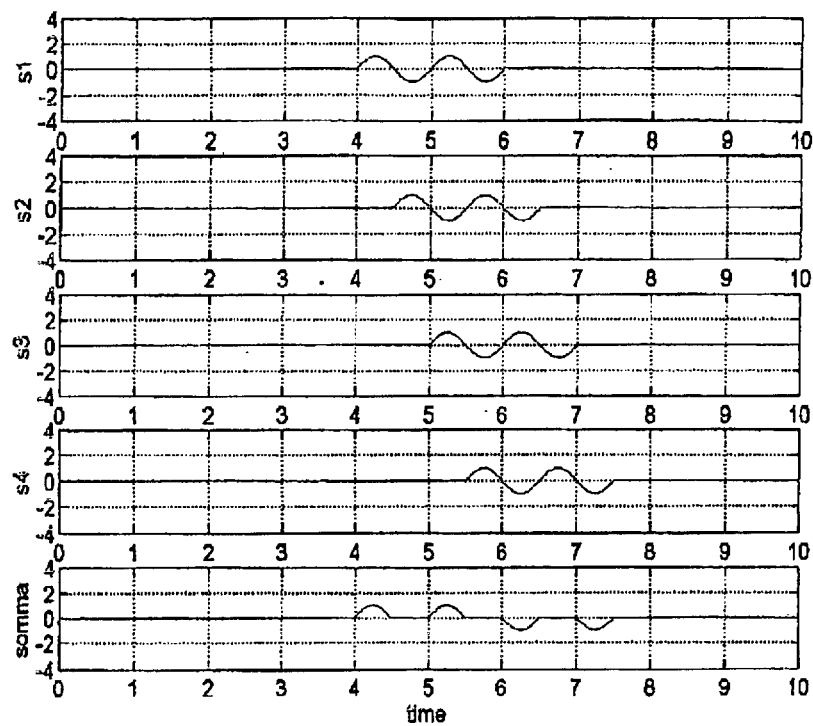
FIGS. 6 and 7 show an aspect of the present invention with reference to actual conditions in which the received signals are of the pulsed type, i.e. limited in time.
Figure 7:
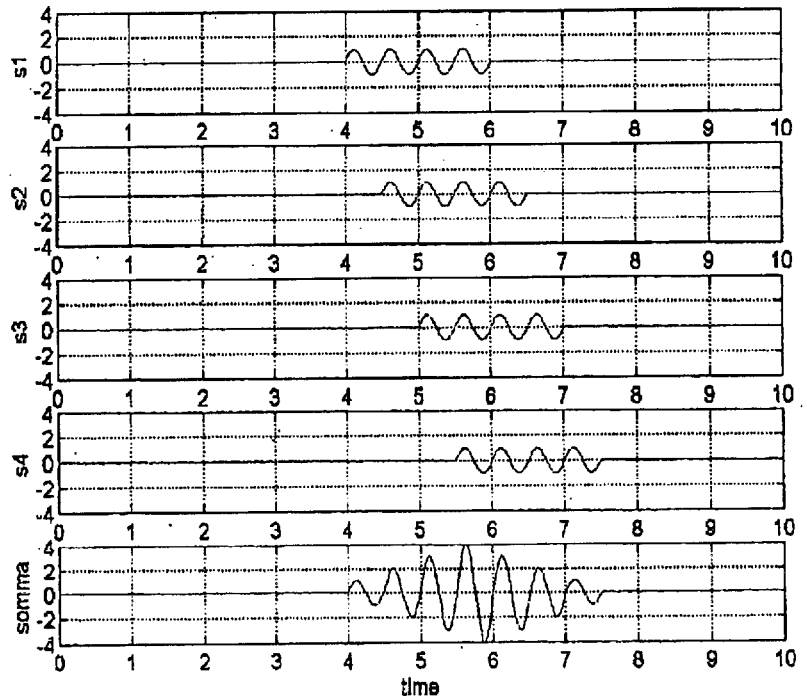

FIGS. 2 to 5 refer to theoretical, non actual conditions, with the received signals of each transducer being represented as continuous signals. In fact, the received signals are of the pulsed type, as shown in FIGS. 6 and 7, still referring to the fundamental frequency and to the second harmonic frequency respectively.

This limitation of the signal in time causes drawbacks that are generally known as "edge effects", i.e. partial overlapping of phase shifted pulses. With respect to fundamental frequency components $f_0$, these edge effects cause an incomplete removal of their sum signal, as is shown in FIG. 6. Regarding second harmonic components, the amplification of their sum signal is reduced and pulses have a longer duration. In these conditions, while the advantages of the invention are not completely lost, the above effects at least partly weaken said advantages.

In order to obviate these undesired side effects, the inventive method provides changes to the calculation of delays to alternately change the phase shift direction between successive received signals of the receiving transducers, in such a manner as to keep the received signals in overlapped positions. This is shown in the examples of FIGS. 8 to 13, which represent three possible variants of this time shift.

A first variant embodiment of signal phase shift direction change consists in the delay calculation term contained in the following equation:

$$b(t, \theta_0) = \sum_i s_i\left(t - \frac{x_i sen\theta_0}{c} - \mathrm{rem}(i/2)\frac{1}{2f_0}\right)$$

As is apparent with respect with the previous equation, the only change relates to the delay determining term used to calculate delays for each receiving transducer, wherein the dependence from the rem(i/2) function replaces the linear dependence from the index "i". This function generates a sequence of alternate "0" and "1" values, depending from the index value, and has been described in greater detail hereinbefore.

Figure 8:
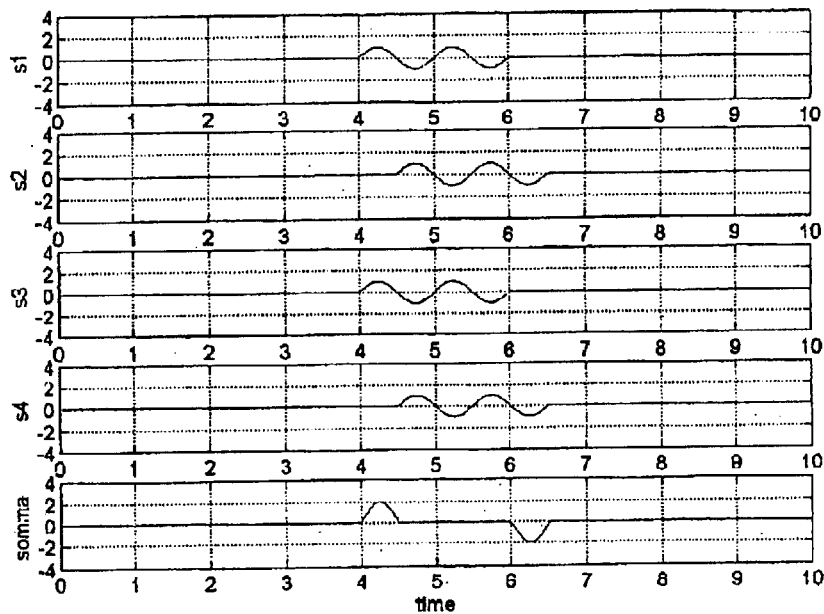
FIGS. 8 through 13 show, in a like manner to FIGS. 4 through 7, the effect of three different modes of phase shift direction alternation between successive received signals of transducers for the purpose of limiting or suppressing the effects shown in FIGS. 6 and 7.
Figure 9:
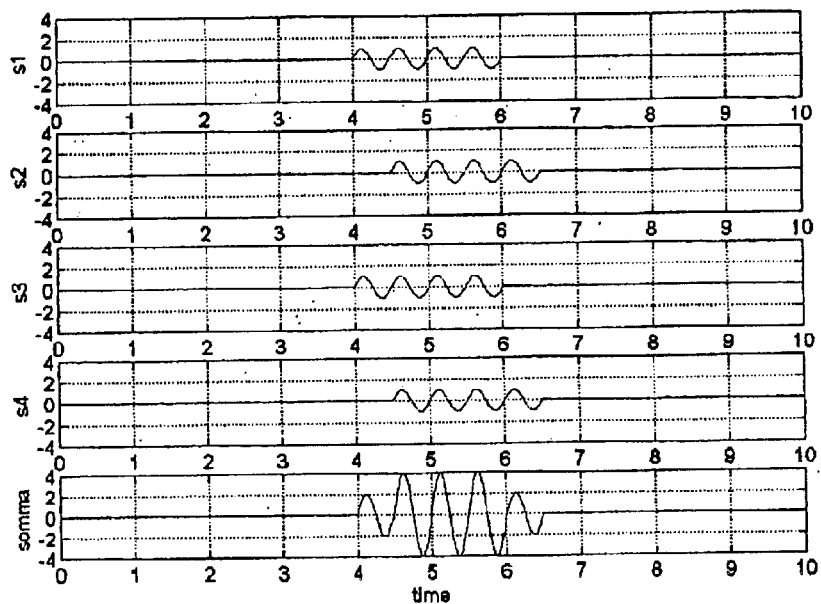

The result thereof is apparent from the corresponding FIGS. 8 and 9. The time shift of the received signals derived therefrom causes a half-cycle shift along the time axis alternately to the right and to the left, whereby the received signals of the individual transducers are aligned in a time shifted manner so as to always remain in substantially overlapped positions or, in any event, to keep the time shift within acceptable tolerances. At the same time, the advantages of a substantial half-cycle shift for fundamental frequency components of a one cycle shift for second harmonic components are unchanged.

The resulting sum signal is shown in the two instances of fundamental frequency components and second harmonic components. This first variant allows a reduction of edge effects, i.e. of the signal parts having a non-zero duration, but involves a considerable amplitude. Also, the non-zero parts of the sum signal appear at the beginning and at the end of the pulse.

Regarding the signal resulting from the sum of second harmonic components, this signal obtains substantially the highest amplification and limits the duration of the sum signal resulting from all the receive signals of transducers.

Figure 10:
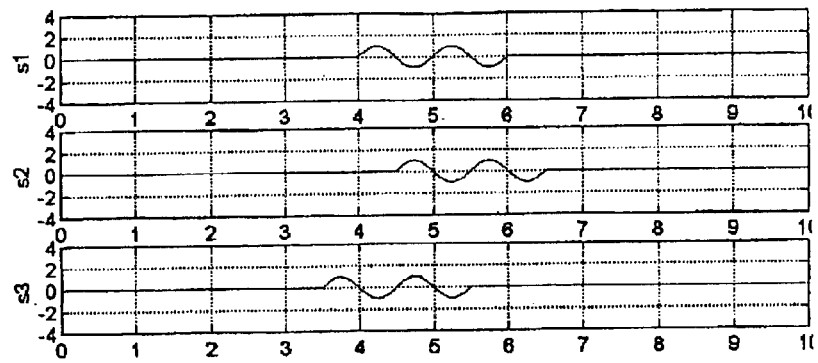
Figure 10:
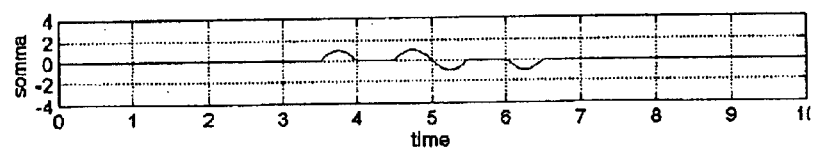
Figure 11:
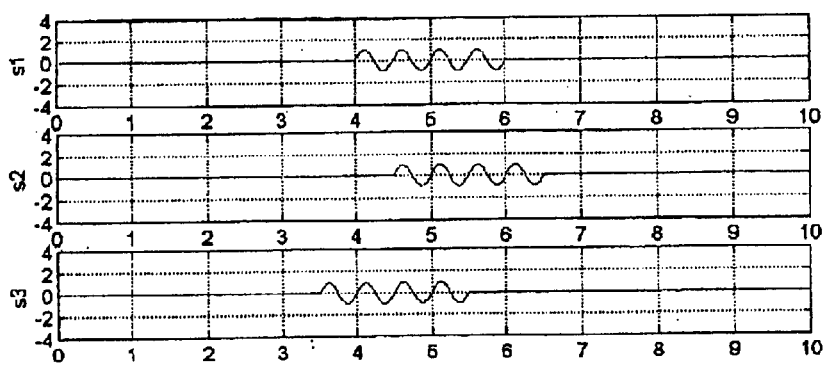
Figure 11:
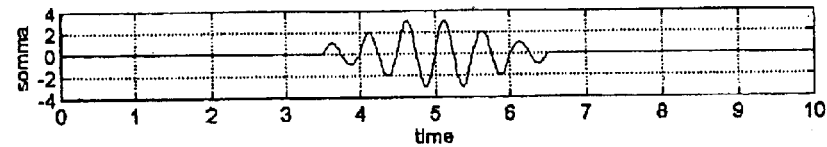

The second variant embodiment, whose effects are shown in FIGS. 10 and 11, provides the replacement of the "i" index by a (rem((i+1)/3)1) function, which produces a 1, 1, 0, 1, 1, . . . sequence. The result is immediately visible in FIGS. 10 and 11. Here again, the received signals of the receiving transducers are still in substantial overlapping positions, like in the previous case.

Regarding the signal resulting from the sum of the fundamental frequency components of the received signal, this signal is shown in FIG. 10 and has edge effects, i.e. non-zero parts of the sum signal, that are arranged along the pulse duration and have a reduced amplitude, i.e. equal to a third of the highest amplification, obtained by the sum of all received signals. However, the signal resulting from the sum of second harmonic components here reaches the highest amplification, while the duration of the signal is rather short (about $1/f_0$).

A third variant of the delay calculation term provides a (1)(i+1)/2rem(i/2) function, instead of the "i" index, to provide a 0, 1, 0, 1, 0, 1, 0, 1, . . . sequence. The effects of such delays on the received signals of transducers both at the fundamental frequency and at the second harmonic are shown in FIGS. 12 and 13.

Figure 12:
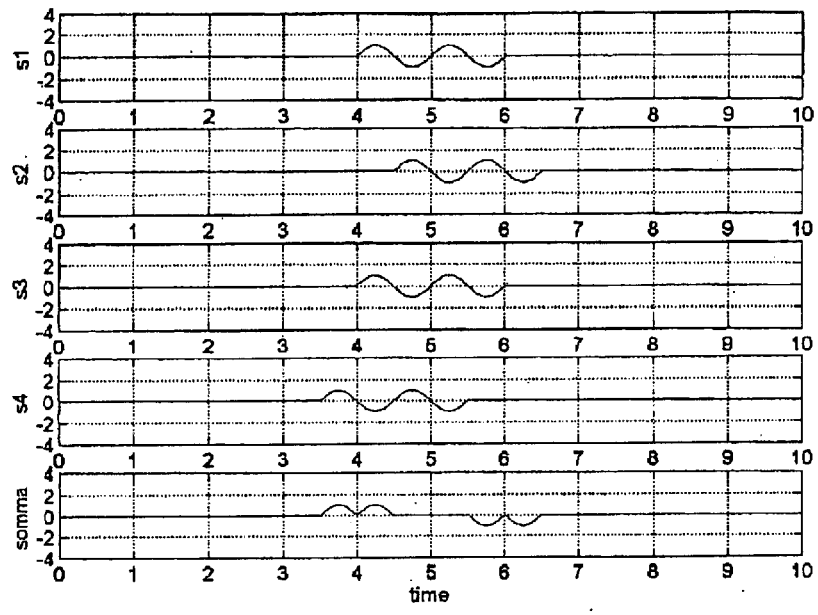
Figure 13:
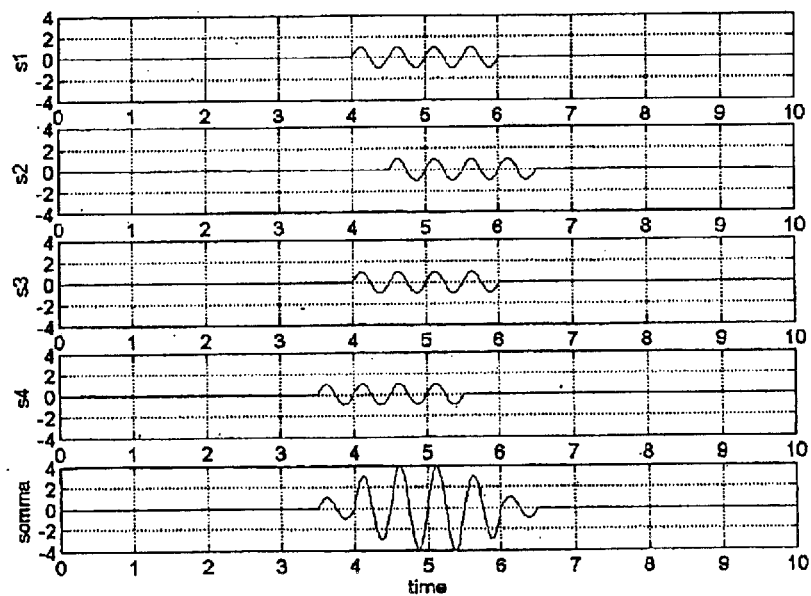

As is apparent from FIG. 12, the signal resulting from the sum of fundamental frequency components of the received signals of transducers has edge effects, i.e. non-zero parts of the signal, which are concentrated at the ends of the pulse and have an amplitude of a quarter of the highest possible amplitude.

Regarding the signal resulting from the sum of second harmonic components, once again the highest amplification is reached, but the duration being still rather short (about $1/f_0$).

As described above with reference to FIGS. 8 to 13, these arrangements provide improvements but do not completely suppress edge effects.

With particular reference, but without limitation, to the embodiments of FIGS. 8, 9, 12 and 13, wherein the signals resulting from the sum of fundamental frequency components of received signals have a non zero value in the end portions, advantages may be obtained by providing, in addition to the above, another arrangement for further reducing the above described edge effects.

Figure 14:
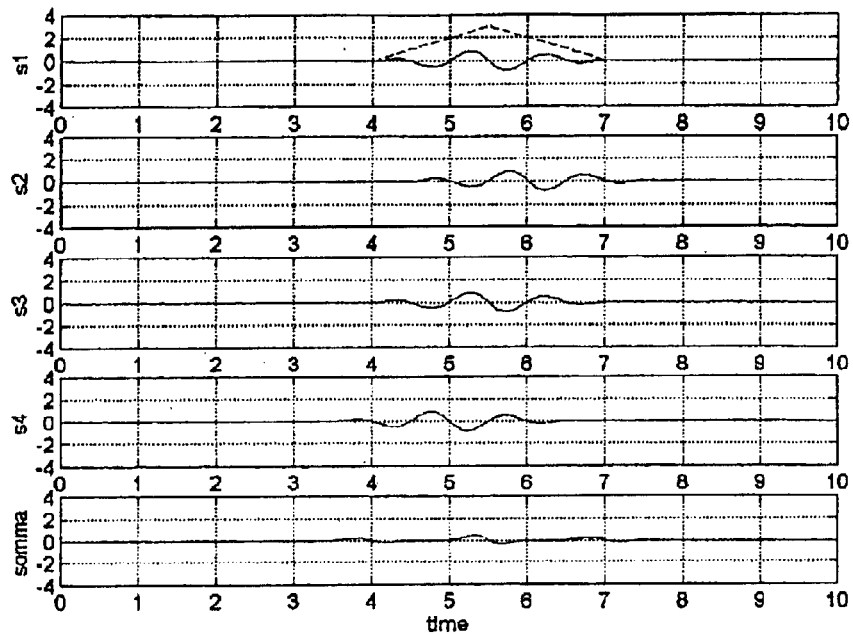
FIGS. 14 and 15 show, in a manner similar to previous Figures, the effects of the use of received signals with a triangular envelope on the signal's fundamental frequency components and on the signal's second harmonic components, respectively.
Figure 15:
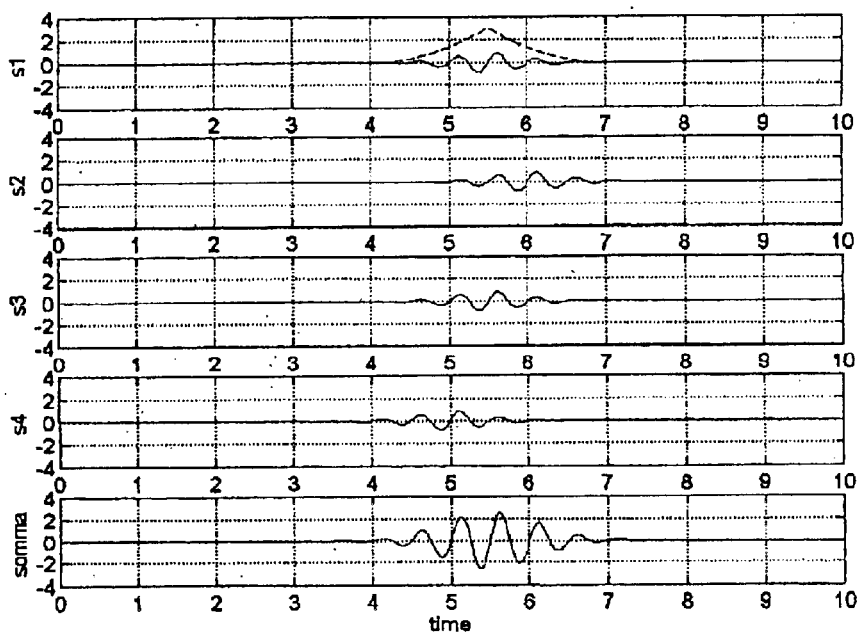

This arrangement is shown in FIGS. 14 and 15 and comprises the transmission of acoustic beams whose waveform has an envelope with smoothed edges. FIGS. 14 and 15 show, by way of example, signals received from a few sensors when a pulse having a triangular envelope is used. The envelope shape is only shown in combination with the received signal S1 and is designated with the I symbol.

The effect thereof on the signals resulting from the sum of fundamental frequency components and second harmonic components, respectively, are, in one instance, a drastic reduction of the non-zero parts of the sum signal to a fraction of $1/8.7$ of the highest possible amplitude and in the other, second harmonic, instance, a slight attenuation of amplification, substantially to a factor of about 0.77 of the highest amplitude is obtained while keeping acceptable duration levels, substantially at the values that would be obtained without this arrangement.

Obviously, other envelope shapes may be provided instead of the triangular envelope, e.g. a Gaussian envelope, or the like.

The advantages of the method of the invention are apparent from the above disclosure. Without having to implement substantial and burdensome fundamental frequency component suppression steps, this suppression may be substantially obtained by simple arrangements in the receiver beamforming process based on the sum of the signal contributions of the individual transducers, i.e. by simply providing an appropriate focusing delay calculation. Yet, further improvement actions would not require considerable increases of processing times and hardware complexity, thereby providing an inexpensive and fast Harmonic Imaging method. The method of the present invention provides advantages not only in terms of imaging times, but also in terms of a lower apparatus cost, thanks to a smaller number of electronic components and to a consequent simplification of the ultrasonic imaging apparatus.

Relating to the above described delay calculation equations, during experiments it has been discovered that the quality of the results improves if the value of the fundamental frequency $f_0$ is chosen as a frequency greater than the effective fundamental frequency of the transmitted beams. It has been observed that increasing the value of the term $f_0$ in the equations to about 25% to 50% of the effective value of the fundamental frequency of the transmitted beams obtains the best results.

A further improvement can be achieved by combining the above mentioned increased value of the term $f_0$, in the delay calculation equation with respect to the fundamental frequency of the transmitted beams, with a high-pass filtering of the summation signal which has a cutting frequency lying between the fundamental frequency and the frequency of the second harmonics.

The most probable explanation of this surprising effect can be obtained by considering the spectrum of the signals. The spectrum of the linear contributions to the received beams, i.e. of the contribution which are to be eliminated from the received signals is partially superimposed on the spectrum of the contribution at the second harmonics which is centered at the double frequency of the fundamental frequency, i.e. of the linear contributions to the received signals. The part of the linear contribution of the received signals which is the most difficult to be eliminated or suppressed is the one superimposing on the spectrum of the signal contribution at the frequency of the second harmonic. This superposition or overlay takes effect at a frequency range which lies between the fundamental frequency and the frequency of the corresponding second harmonic. For this reason by increasing the value of $f_0$ in the delay calculation equations relatively to the value of the effective fundamental frequency, it is possible to suppress or decisively reduce the part of the spectrum of the linear contributions to the signals which is superimposed or overlaid on the spectrum of the contributions at the frequency of the second harmonic, and thus the part of the spectrum of the linear contribution which has the higher damaging effects on the quality of the image. If a part of the spectrum of the linear contribution of the signals, i.e. of the contribution which spectrum is centered at the fundamental frequency still rests after having suppressed the part of the spectrum of the linear contribution overlaid or superimposed on the spectrum of the contributions at the frequency of the second harmonics, these parts are spread away from the spectrum of the contributions at the frequency of the second harmonic and can be suppressed or eliminated by means of high-pass filtering.

While the delay calculation methods that use the above equations may be directly implemented in hardware, i.e. in transmission beamforming units, without requiring any substantial change to existing apparatus, the invention addresses an ultrasonic imaging apparatus which is particularly adapted for the implementation of the method.

Figure 16:
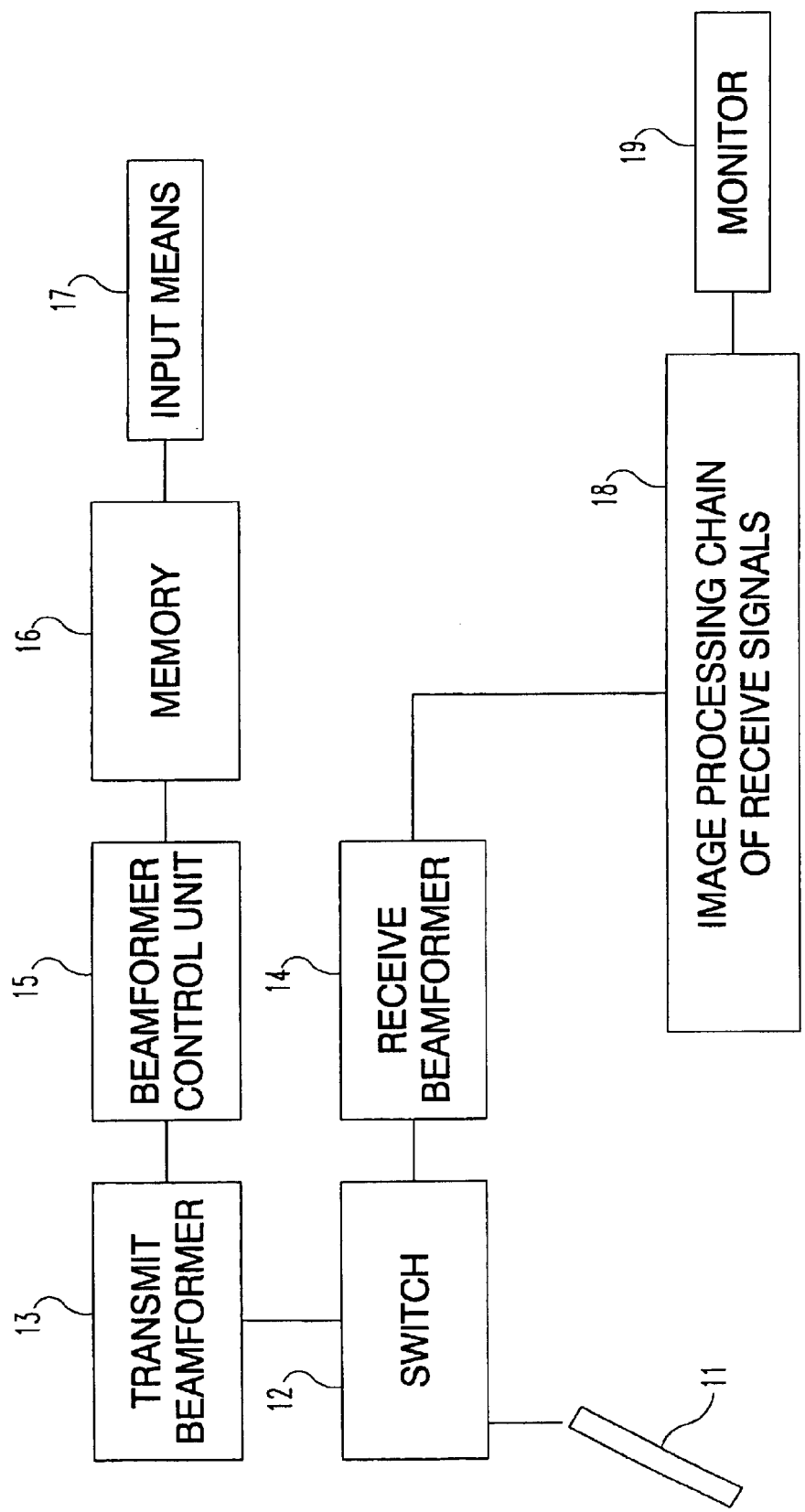
FIG. 16 shows a block diagram of an ultrasonic imaging apparatus used to implement the inventive method.

Referring to FIG. 16, an ultrasonic imaging apparatus has an ultrasonic probe 10, which includes an array of transducers. The transducers have both receiving and transmitting functions and are alternately connected, in synchronism with the ultrasonic beam transmission and reflected wave reception steps, to a transmission beamforming unit 13 and to a receiver beamforming unit 14 through a switch 12. The signal output from the beamforming unit 13 is forwarded to a processing chain to generate image data therefrom, which processing chain is known and generally designated with numeral 18. Image data is then displayed on a monitor or other display means 19.

In accordance with the present invention, at least the receiver beamforming unit 14 may be controlled by a programmable control unit 15, which has a memory 16 wherein at least one of the beamforming methods, i.e. the delay calculation according to the invention, may be entered by input means 17, such as a keyboard, or the like. Advantageously, thanks to this construction, all the various algorithm types of the invention may be provided in the memory as alternate selections. This permits updating of the beamforming algorithms, i.e. delay calculation algorithms, with improved new-generation algorithms without providing a structural change to the apparatus.

The unit for generating envelope signals is not shown separately from the transmission beamforming unit 13, and is intended as to be schematically contained in unit 13. Here again, the envelope function may be defined in the control unit 15, and selected among different waveforms that may be entered through input means 17 or contained in the memory 16.

Obviously, the invention is not limited to the above description and figures, but may be greatly varied, and particularly the apparatus may be varied as regards construction, and the method may be varied by combination with other well-known imaging methods, all the above without departure from the inventive teaching disclosed above and claimed below.

What I claim is:

1. A method for receiver beamforming for use in ultrasonic imaging, said method comprising the steps of:

transmitting by means of at least one electroacoustic transducer at least one beam of acoustic wave signals into a body under examination, said signals being transmitted at a first frequency;

receiving said acoustic wave signals reflected by said body under exmination through an array of receiving electroacoustic transducers;

synchronizing said signals received by each of said receiving transducers by applying delays to said received signals, said delays being a function of the focusing of said transducers on said area, line or point of said body under examination;

summing said synchronized signals from said transducers;

separating from said summed signals components having even harmonics of said first frequency;

transforming said separated components of said summed signals into image data of the structure of said body under examination;

displaying said image data by display means; and wherein said delays are also determined as a function of said even harmonics of said first frequency and as a function of the position of said receiving transducers in said array of receiving transducers.

2. A method as claimed in claim 1, characterized in that the delay calculation function depends, linearly or non linearly, on the position of each receiving transducer in the receiving transducer array.

3. A method as claimed in claim 1, characterized in that a term is added to the delay calculation function for one of said receiving transducer, said term being determined by the frequency of said harmonics, said term also being determined by the position of said one of said receiving transducers in said array of receiving transducers.

4. A method as claimed in claim 1, characterized in that said delay is a function of said component of said received signal to be used for image data transformation, and is such as to cause a phase shift of said received signals, such that components of said first frequency are suppressed when said synchronized signals are summed.

5. A method as claimed in claim 1, characterized in that said first frequency is the fundamental frequency component of said received signals and said even harmonic components of said received signals to be used for imaging are the second harmonics of said first frequency.

6. A method as claimed in claim 1, characterized in that said delays are determined in a manner such that fundamental frequency components of said received signals are phase shifted by a half-cycle such that said even harmonic components of said received signals of said receiving transducers are in phase, whereby said summing of said synchronized signals causes the suppression of said fundamental frequency and said even harmonic components of said synchronized signals are summed in a non destructive manner to form amplified signal.

7. A method as claimed in claim 6, characterized in that said summed signals are determined by using the following equation $$b(t, \theta_0) = \sum_i s_i\left(t - \frac{x_i \sin\theta_0}{c} - i\frac{1}{2f_0}\right)$$

where: "i"=transducer index;
$f_0$:=fundamental frequency;
$X_i$:=distance of the transducer "i" from a predetermined reference point;
$S_i$:=receive signal from the transducer "i";
$\theta_0$:=steering angle;
b(t, $\theta_0$):=sum signal.

8. A method as claimed in claim 7, characterized in that said function to calculate said delay for each of said receiving transducers is associated with a phase shift direction changing sequence in which the elements of said sequence are applied as a function of each of said transducers in said transducer array.

9. A method as claimed in claim 8, characterized in that said function provides a 0, 1, 0, 1, 0, 1, . . . corresponding to a rem(i/2) function, where "i" is the index of each transducer in the transducer array, in lieu of the simple index "i".

10. A method as claimed in claim 9, characterized in that the function for calculating said receiver delay for each of said transducers is as follows:

$$\frac{x_i \sin\theta_0}{c} + \text{rem}(i/2)\frac{1}{2f_0}$$

whereas the function for summing the receive signals from all receiving transducers is as follows:

$$b(t, \theta_0) = \sum_i s_i\left(t - \frac{x_i \sen\theta_0}{c} - \text{rem}(i/2)\frac{1}{2f_0}\right)$$

where: "i"=transducer index;
$f_0$:=fundamental frequency;
$X_i$:=distance of the transducer "i" from a predetermined reference point;
$S_i$:=receive signal from the transducer "i";
$\theta_0$:=steering angle;
b(t, $\theta_0$):=sum signal.

11. A method as claimed in claim 8, characterized in that said function provides a sequence, 0, 1, 0, 1, 1, 1, . . . corresponding to a (rem((i+1)/3)1) function, where "i" is the index of each transducer in the transducer array.

12. A method as claimed in claim 8, characterized in that said function provides a sequence including the elements 0, 1, 0, 1, 1, 1, . . . and corresponding to a $(-1)^{(i+1)/2}$ rem(i/2), where "i" is the index of each transducer in the transducer array.

13. A method as claimed in claim 6, characterized in that in order to at least partly suppress or reduce the non-zero parts of said summed signals, a change in the phase shift direction of successive received signals is provided with reference to the moment in which said received signals are received from each of the receiving transducers of said transducer array, said phase shift being kept substantially constant for components at said first frequency and for said components at said even harmonic frequency.

14. A method as claimed in claim 1, characterized in that said delay for each of said receiving transducers is determined by using the following function $$\frac{x_i \sin\theta_0}{c} + i\frac{1}{2f_0}$$

where:
"i"=transducer index;
f0:=fundamental frequency;
$X_i$:=distance of the transducer "i" from a predetermined reference point;
$\theta_0$:=steering angle.

15. A method as claimed in claim 1, characterized in that said transmitting comprises at least one pulsed signal having an envelope with smoothed edges.

16. A method as claimed in claim 15, in which said pulsed signal comprises a triangular envelope.

17. A method as claimed in claim 15, in which said pulsed signal comprises a Gaussian envelope.

18. A method as claimed in claim 15, characterized in that said envelope is smoothed by using filters.

19. A method as claimed in claim 1, characterized in that said transmitted acoustic wave signals are generated within an envelope having smoothed edges.

20. A method as claimed in claim 19, characterized in that said signals comprise a triangular envelope.

21. A method as claimed in claim 19, characterized in that said signals comprise a Gaussian envelope.

22. A method as claimed in claim 1, characterized in that said delays are also calculated as a function of the distance of said reflection sources from the origin of a selected coordinate system which describes the ultrasonic beam propagation space.

23. A method as claimed in claim 1, characterize in that in the calculation of said delays includes a term relating to the value of said first frequency which is chosen to be greater than the value of said first frequency, said first frequency being the fundamental frequency of said transmitted beams.

24. A method according to claim 23, characterize in that the value of said term is increased by between 25% to 50% of the effective value of said first frequency of said transmitted beams.

25. A method according to claim 23, characterized in that high-pass filtering of said summed signal is carried out with a cutting frequency lying between said fundamental frequency and said even harmonic frequency, said even harmonic frequency being the frequency of the second harmonic of said transmitted beams.

26. An ultrasonic imaging apparatus comprising:
at least one ultrasonic probe having a plurality of transmitting transducers for generating transmission beams, and a plurality of receiving transducers;
a beamformer coupled to said receiving transducers for applying receiver signal synchronization delays to each of said receiving transducers, said delays being determined with reference to the direction in which said transducers are focused;
means for processing received signals from each of said receiving transducers, including means for attenuating the fundamental frequency component of said received signals;
means for summing said received signals from their respective ones of said receiving transducers;
means for transforming said summed signals into image data;
display means for displaying said image data in the form of graphic images; and
a programmable control means for controlling said beamformer, said control means comprising one or more algorithms used for calculating said delays, said delays being calculated as a function of the position of said transducer in said transducer array, said delays further being calculated with respect to a predetermined reference point, based on the steering angle, on the focusing distance and on a predetermined harmonic of the fundamental frequency of said received signals.

27. An apparatus as claimed in claim 26, characterized in that said beamformer is programmed or controlled by said control means that is programmable to calculate said delays for each of said receiving transducers in order to generate a change in the phase of said received signals.

28. An apparatus as claimed in claim 27, characterized in that said phase change is caused by the functional dependence of delays from said predetermined harmonic frequency, said predetermined harmonic frequency being the second harmonic frequency of said received signals.

29. An apparatus as claimed in claim 26, characterized in that said beamformer is programmed or controlled by said control means in such a manner as to calculate received signals for each of said receiving transducer according to the following function:

$$\frac{x_i \sin\theta_0}{c} + i\frac{1}{2f_0}$$

where: "i"=transducer index;
$f_0$:=fundamental frequency;
$X_i$:=distance of the transducer "i" from a predetermined reference point;
$\theta_0$:=steering angle.

30. An apparatus as claimed in claim 26, characterized in that said beamformer is controlled by said control means in such a manner as to combine the phase shift of said received signals from each of said transducers, said phase shift being caused by the application of functional delays and by the dependence thereof from said second harmonic frequency, with a phase shift direction changing sequence, composed of alternate "0" and "1" elements.

31. An apparatus as claimed in claim 30, characterized in that said phase shift changing sequence is defined by a rem (i/2) function, where "i" is the index of the transducer in the transducer array, the delay calculation algorithm being as follows:

$$\frac{x_i \sin\theta_0}{c} + \text{rem}(i/2)\frac{1}{2f_0}$$

where: "i"=transducer index;
$f_0$:=fundamental frequency;
$X_i$:=distance of the transducer "i" from a predetermined reference point;
$\theta_0$:=steering angle.

32. An apparatus as claimed in claim 30, characterized in the said phase shift changing sequence is 0, 1, 1, 0, 1, 1, . . . corresponding to a (rem((i+1)/3)1) function, where "i" is the index of each transducer in the transducer array.

33. An apparatus as claimed in claim 30, characterized in that said phase shift changing sequence includes the elements 0, 1, 0, 1, 0, 1, 0, 1, . . . corresponding to a $(-1)^{(i+1)/2}\text{rem}(i/2)$ function, where "i" is the index of each transducer in the transducer array.

34. An apparatus as claimed in claim 26, further comprising means for generating in at least one of said transmission beams a pulse comprising an envelope with smoothed edges.

35. An apparatus as claimed in claim 34, wherein said pulse comprises a triangular envelope.

36. An apparatus as claimed in claim 34, wherein said pulse comprises a Gaussian envelope.

37. An apparatus as claimed in claim 26, further comprising means for generating a smoothed envelope in the echoes contained in one or more or said received signals.

38. An apparatus as claimed in claim 37, wherein said echoes form a triangular envelope.

39. An apparatus as claimed in claim 37, wherein said echoes form a Gaussian envelope.

40. An apparatus as claimed in claim 26, further comprising means for increasing the value of the fundamental frequency $f_0$ in the delay calculation equations.

41. An apparatus according to claim 40, characterized in that the value of the term $f_0$ is increased to between 25% to 50% of the effective value of the fundamental frequency of said transmission beams.

42. An apparatus according to claim 26, characterized in said summing means comprises a high-pass filter having a cutting frequency lying between the fundamental frequency and the frequency of the second harmonic of said received signals.

* * * * *

UNITED STATES PATENT AND TRADEMARK OFFICE
CERTIFICATE OF CORRECTION

PATENT NO. : 6,866,633 B2
DATED : March 15, 2005
INVENTOR(S) : Trucco

It is certified that error appears in the above-identified patent and that said Letters Patent is hereby corrected as shown below:

Column 6,
Line 28, please replace the equation $b(t,\theta_0) = \sum_i s_i\left(t - \frac{x_i \operatorname{sen}\theta_0}{c} - \operatorname{rem}(i/2)\frac{1}{2f_0}\right)$ with the following: $b(t,\theta_0) = \sum_i s_i\left(t - \frac{x_i \sin\theta_0}{c} - \operatorname{rem}(i/2)\frac{1}{2f_0}\right)$ Column 7,
Line 28, please replace the equation $b(t,\theta_0) = \sum_i s_i\left(t - \frac{x_i \operatorname{sen}\theta_0}{c} - i\frac{1}{2f_0}\right)$ with the following: $b(t,\theta_0) = \sum_i s_i\left(t - \frac{x_i \sin\theta_0}{c} - i\frac{1}{2f_0}\right)$ Column 8,
Line 15, please replace the equation $b(t,\theta_0) = \sum_i s_i\left(t - \frac{x_i \operatorname{sen}\theta_0}{c} - \operatorname{rem}(i/2)\frac{1}{2f_0}\right)$ with the following: $b(t,\theta_0) = \sum_i s_i\left(t - \frac{x_i \sin\theta_0}{c} - \operatorname{rem}(i/2)\frac{1}{2f_0}\right)$ Column 11,
Line 25, please change "exmination" to -- examination --
Line 50, please change "transducer" to -- transducers --
Line 51, please change "frequency of said harmonics" to -- frequency of said even harmonics --

Column 12,
Line 13, please replace the equation $b(t,\theta_0) = \sum_i s_i\left(t - \frac{x_i \sin\theta_0}{c} - i\frac{1}{2f_0}\right)$ with the following: $b(t,\theta_0) = \sum_i s_i\left(t - \frac{x_i \sin\theta_0}{c} - i\frac{1}{2f_0}\right)$

UNITED STATES PATENT AND TRADEMARK OFFICE
CERTIFICATE OF CORRECTION

PATENT NO. : 6,866,633 B2
DATED : March 15, 2005
INVENTOR(S) : Trucco

It is certified that error appears in the above-identified patent and that said Letters Patent is hereby corrected as shown below:

Column 12 (cont'd),
Line 46, please replace the equation $b(t,\theta_0) = \sum_i s_i\left(t - \frac{x_i \operatorname{sen}\theta_0}{c} - \operatorname{rem}(i/2)\frac{1}{2f_0}\right)$ with the following: $b(t,\theta_0) = \sum_i s_i\left(t - \frac{x_i \sin\theta_0}{c} - \operatorname{rem}(i/2)\frac{1}{2f_0}\right)$ Signed and Sealed this Twenty-fourth Day of May, 2005

JON W. DUDAS
*Director of the United States Patent and Trademark Office*